United States Patent Office 2,844,553
Patented July 22, 1958

2,844,553
POLYHYDRIC PHENOL-ALDEHYDE-EPIHALO-HYDRIN RESINS

Robert S. Taylor, Oak Lawn, and Lynwood N. Whitehill, Homewood, Ill., assignors to The Sherwin-Williams Company, Cleveland, Ohio, a corporation of Ohio No Drawing. Application April 24, 1953
Serial No. 351,034

13 Claims. (Cl. 260—19)

This invention relates as indicated to certain novel resinous materials which are particularly useful as coating composition ingredients and as intermediates in the preparation of still other coating composition ingredients. These resins are characterized in that they may be hardened by baking or air drying with the addition of a curing catalyst, such as polyamine, e. g., ethylene diamine.

Ether resins are, in the broad sense of the term, a class of resins which have an ether linkage uniting the repeating or alternating structures which characterize the resin. This linkage is common and is usually present to the same degree as any other building segment of the polymer. One of the more common types of ether resins is made from bis-(p-hydroxy phenyl) dimethyl methane (bisphenol A) and epichlorohydrin. A variety of products may be obtained in this reaction depending on conditions of reaction, relative amounts of reactants, type of reaction promoter, etc. Such products may be represented by the following formulae:

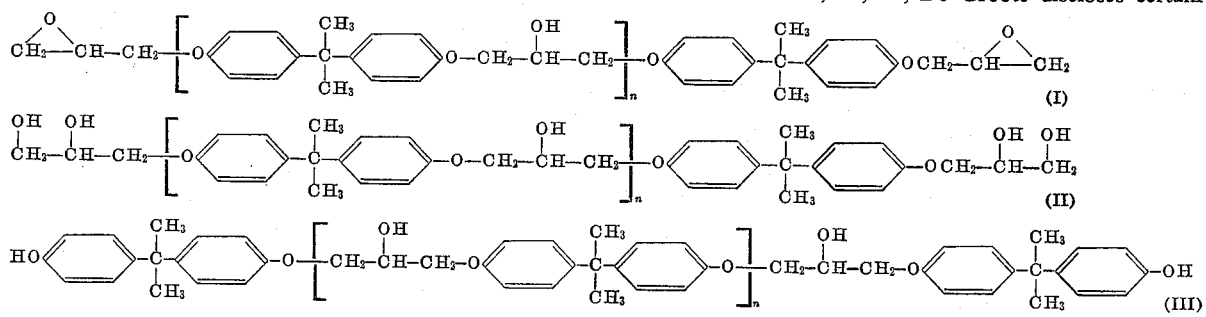

A given product may be a mixture of two or more of the foregoing.

The above types of ether resins are of the aliphatic-aromatic class.

Another class of ether resin is entirely aliphatic in nature and may be considered reaction products of a glycol or polyol with an epihalohydrin. Illustrative of this aliphatic class is the product made from the polyol, glycerine, and epichlorohydrin, the non-functional hydrogens being omitted for brevity:

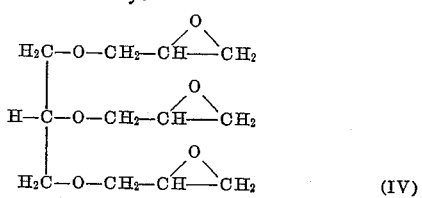

Other polyols may be used, e. g., trimethylol butane, pentaerythritol, etc. It is obvious that when any polyol with more than two hydroxyl groups in the molecule is reacted with an epihalohydrin, that polyepoxides with more than two epoxide groups may result. These materials, therefore, possess high epoxide functionality.

From the foregoing structures many types of useful vehicles can be made. Most of these vehicles are made by taking advantage of the functional groups, namely the epoxide groups and the hydroxyl groups. They can be esterified to give resins with drying properties or, where epoxy groups are present, reacted with amines to yield superior baking vehicles. Pigments may be added if desired.

The resins represented by Formula I above when $n$ is a large number, i. e., 10–20, are not wholly satisfactory in that the functionality due to epoxy groups (hereinafter called epoxide-functionality) is low in relation to the molecular weight of the resin. Hence, to improve the epoxide-functionality it has been the practice to add a proportion of an aliphatic-polyepoxide of high epoxy content to a material such as shown by Formulas I, II and III or a mixture thereof, having a low epoxy content with respect to the balance of the molecule.

The low molecular weight epoxy compounds such as the aliphatic epoxide (IV) are poor from the standpoint of final film properties and admixture of such compounds with low epoxide functionality higher molecular resins dilutes certain of the desirable film properties of the latter while improving the curing properties. Hence the tolerances for admixture are narrowly confined in order to secure films of satisfactory properties.

The resins of the present invention differ from those of prior practice in that they combine in a single molecule both high epoxide-functionality with high molecular weight and thereby yield upon curing films with a wider range of properties. As indicated above, the film properties obtained by prior practice have been limited in certain respects in admixtures because of the introduction of deleterious properties in order to improve others.

In Patent No. 2,564,191, De Groote discloses certain phenol-aldehyde-alkylene oxide resins which are produced by acid-condensing an aldehyde with a bisphenol in a 1:1 mol ratio and subsequently reacting the condensate thus obtained with an alkylene oxide at an elevated temperature, e. g., 150–200° C., using a basic catalyst. The amount of alkylene oxide used varies upwards from 100% by weight of original resin. Hence a large molar excess of alkylene oxide is employed to make the patentee's resin which is characterized in that it is distinctly hydrophile, at least to the degree that it is self-emulsifying in water upon shaking the aqueous mixture. Water solubility of the final resin is a highly desired characteristic of the product.

Water solubility or hydrophilic natures is introduced by reacting a large excess of alkylene oxide with the phenol-aldehyde resin whereby long chains of

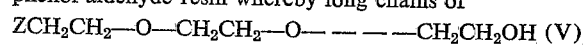

are introduced where Z is a phenolic nucleus. This type of reaction destroys any possibility of epoxide groups being present in the final product since the reaction depends upon ring cleavage. It is stated that under certain unidentified conditions alternate reactancts to the alkylene oxides are suggested among which is epichlorohydrin, particularly where the phenol hydroxyl has been converted to a phenolate or alkoxide.

There are several essential differences between the products of this invention and those of the prior art. Because of the presence of intact epoxide rings

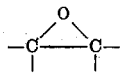

in the final resin, and the absence of polyalkylene oxide chains, these products are hydrophobic, that is they are not soluble in water or self-emulsifiable therewith. The polyalkylene oxide resins of the prior art containing structures as shown above (V) are hydrophilic in character and contain no free epoxide groups since the reaction is primarily designed to cause ring cleavage and chain formation. The resins of this invention vary in viscosity at 100% NVM from syrups to semi-solids and will cure by the addition of from 1% to 10% by weight of the resin of a polyamine, such as, ethylene diamine. The hydrophilic products containing no epoxy groups will not harden or cure by the addition of a polyamine. The temperature at which the reaction is conducted using an epihalohydrin is critical since it has been found that temperatures in excess of 155° F. cause decomposition of the epoxy group, and at low molar ratios such as used in the present invention high temperatures cause gellation in the reaction container.

The resins of the present invention are distinguished from those of application Ser. No. 308,724, filed September 9, 1952, by James A. Arvin and Robert S. Taylor in that the resins of said application will harden in the presence of hexamethylene tetramine under room temperature or baking conditions due to activation of methylol groups by ammonia and formaldehyde freed during the decomposition of hexamethylene tetramine. The resins of the present invention do not so harden since the proportions employed here do not produce active free alkylol groups to the extent necessary for alkylol-condensation.

It is a primary object of this invention, therefore, to provide a novel ether resin having high epoxide-functionality chemically associated with high molecular weight.

Another object of this invention is to provide a novel ether resin of the aromatic-aliphatic type containing an average of more than two epoxide groups per molecule.

Another object of this invention is to provide a new method for making ether resins of the aromatic-aliphatic type containing an average of more than two epoxide groups per molecule.

Still another object of this invention is to provide an ether resin of the aromatic-aliphatic type containing an average of more than two epoxide groups per molecule which is curable by polyamines at room temperature or at elevated temperatures.

Still another object of this invention is to provide novel resinous material characterized by yielding films of outstanding flexibility, toughness, adhesion and gloss.

Other objects of this invention will appear as the description proceeds.

To the accomplishment of the foregoing and related ends, said invention, then, consists of the means hereinafter fully described and particularly pointed out in the appended claims, the following description setting forth in detail certain illustrative embodiments of the invention, such disclosed means constituting, however, but a few of the various forms in which the principle of this invention may be employed.

Generally stated, the resinous materials of the present invention are hydrophobic and are prepared by condensing a dihydric polynuclear phenol with an aldehyde, either aliphatic or aromatic to a low polymer stage, i. e., A—B—A, A—B—A—B, or A—B—A—B—A, where A is the hydrogen-diminished residue of the dyhydric polynuclear phenol and B is the hydrogen and oxygen diminished residue of the aldehyde, and then reacting this intermediate with an epihalohydrin at a temperature below about 155° F. in the presence of a base. The aldehydes used herein may contain from 1 to 20 carbon atoms and be either aromatic, e. g., benzaldehyde, or aliphatic, e. g., formaldehyde, acetaldehyde, propionaldehyde, butyraldehyde, heptaldehyde, etc. Where it is desired to acquire improved solubility and fluidity characteristics in the final resin, it is preferred to employ aldehydes of 2 or more carbon atoms and particularly aliphatic aldehydes of from 4 to 7 carbon atoms. The condensation of aldehyde with the phenol is preferably carried out in the presence of alkali, e. g., KOH, NaOH, etc., although under certain circumstances acid or acid-alkali condensation may be used.

The major portion of phenol-aldehyde intermediates of this invention are believed to have the following general formula, subject, of course, to some minor amount of unidentifiable although apparently harmless by-products of reaction.

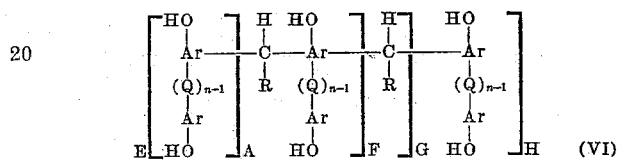

wherein Ar is an aromatic nucleus, Q is a bivalent substantially non-reactive linking material selected from the group consisting of oxygen, sulphur, carbonyl, and alkylene or alkylidene groups containing from 1 to 10 carbon atoms, R is selected from hydrogen and organic radicals containing from 1 to 19 carbon atoms, and $n$ is 1 or 2.

Naturally, since all reactions of this type do not usually proceed to 100% conversion, there may be a certain minor amount of unreacted dihydric phenol present as represented by EA. This will not interfere with further reactions of the resin. If EG is present in the final product, the free valence is satisfied with OH.

When an epihalohydrin, such as epichlorohydrin or epibromohydrin, is reacted with the foregoing basic unit, under the conditions herein specified, there is obtained a structure which may be expressed as follows:

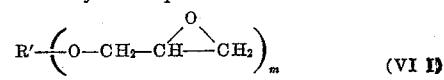

wherein R' is EA, EF, EG, EH, or a mixture of two or more thereof diminished by $m$ phenolic hydrogen atoms, $m$ being the number of epoxy groups introduced and which averages from 2.25 to about 6 per basic unit. In general, the amount of epihalohydrin used is sufficient to substantially entirely satisfy the phenolic hydroxyls present in the condensation product. The products are generally heavy syrups to semi-solids at room temperature and stable to heat. These resins are hydrophobic and will not dissolve in or self-emulsify in water.

THE POLYHYDRIC PHENOL

A principal starting material for forming the resins of this invention is preferably a dihydric polynuclear phenol having the general formula:

HO—Ar—(Q)$_{n-1}$—Ar—OH     (VIII)

wherein Ar is an aromatic nucleus having at least one reactive position (i. e., ortho or para to the OH group) open, Q is a bivalent linking element or group, and $n$ is 1 or 2. The linking group or bond (as when $n$ is 1) may be either ortho or para to the OH group. When Q is para to the OH group, the resulting sub-group of compounds will be recognized as analogous to the so-called "bisphenols." In the para position to the OH the compounds are a bis-phenol type in the broad sense of the term. For convenience, however, both the preferred starting materials here mentioned are contemplated by the Formula VIII above.

Among the dihydric polynuclear phenols useful herein are 4,4'-dihydroxy diphenyl sulphide; 4,4'-dihydroxy-5,5'-dimethyl diphenyl oxide; 4,4'-dihydroxy diphenyl methane; 2,2'-dihydroxy diphenyl methane; 4,4'-dihydroxy diphenyl ethane-1,2; 4,4'-dihydroxy diphenyl methyl methane; 4,4'-dihydroxy diphenyl dimethyl methane (bisphenol A); 4,4'-dihydroxy diphenyl cyclohexane-1.1; 4,4'-dihydroxy diphenyl dipropyl methane; 4,4'-dihydroxy-3,3'-dichloro diphenyl dimethyl methane; 2,2'-bis(4-hydroxy naphthyl) dimethyl methane; 4,4'-dihydroxy diphenyl ketone; 4,4'-dihydroxy diphenyl, etc. Certain of these compounds, namely, the 4,4'-dihydroxy diaryl alkanes are generally manufactured by reacting a ketone, e. g., acetone, methyl ethyl ketone, dibutyl ketone, cyclohexanone, etc., with a phenol. For the procedure and further examples see U. S. Patent No. 2,182,308.

It will be seen that in the foregoing Formula VIII Q may be a substantially non-reactive element or group in the environment such as oxygen, sulphur, $>C=O$, $-CH_2-$,

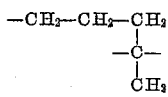

and the like, and $n$ may be 1 or 2.

THE INTERMEDIATE PHENOL-ALDEHYDE

As above indicated, the bisphenol is then reacted with an aldehyde having the formula

wherein R" is an aliphatic or aromatic radicle containing from 1 to 19 carbon atoms to form a bisphenol-aldehyde condensation product of low molecular weight (i. e., monomer, dimer or trimer—see Formula VI) before reaction with an epihalohydrin. Specific examples of aldehydes thus useful herein include: formaldehyde, propionaldehyde, butyraldehyde (n-, and iso-), pentaldehyde, hexaldehyde, heptaldehyde, octaldehyde, decaldehyde, octadecaldehyde, 2-ethyl hexaldehyde, cyclohexaldehyde, benzaldehyde, phenyl ethyl aldehyde, etc. To arrive at the bisphenol aldehyde intermediate which is later reacted with an epihalohydrin, from 0.25 to .65 mol per mol of bisphenol of the aldehyde is used. The preferred amount is 0.5 mol/mol.

The bisphenol-aldehyde condensation product used in the reaction with an epihalohydrin must contain at least an average of 2.25 phenolic hydroxyl groups per molecule, preferably 2.5–3.5 such groups, and not more than 8 as an average. Moreover, the bisphenol-aldehyde intermediate so reacted with an epihalohydrin must be non-gelled.

Reference has been made above to the fact that the bisphenol-aldehyde condensation products useful in accordance herewith are condensed to a low molecular weight stage. By this term as used herein it is intended to mean that the condensation of the phenol with the aldehyde has been substantially completed, but that the nature of the reaction is such that the desired product is selected from A—B—A, A—B—A—B, and A—B—A—B—A polymers where A is the phenol portion and B is the aldehyde. The preferred mol ratio between dihydric polynuclear phenol and aldehyde is 1:0.5 or 2:1, respectively. A slight excess of aldehyde is more satisfactory than a deficiency and hence the preferred range is from 1:0.5 to 1:0.65 although useful products in accordance herewith have been made at ratios of from 1:0.25 to 1:0.65.

With water-soluble reactants, little difficulty is experienced in condensing the phenol with the aldehyde in the presence of an acid or a base and the techniques for accomplishing this are well known. With the alkyl substituted phenols and more complex phenols which are water-insoluble, and with higher aldehydes, it has been found desirable to carry out the reaction in the presence of a wetting agent as taught in the patent to Hunn, 2,330,217, dated September 28, 1943.

Although the phenol-aldehyde condensation products can be made using either an acidic or a basic catalyst, or a combination of both, it is preferred for purposes of this invention to use a basic catalyst, e. g., sodium hydroxide, potassium hydroxide, calcium hydroxide, barium hydroxide, in order to produce low molecular weight derivatives of the A—B—A, A—B—A—B, and A—B—A—B—A types above discussed. In certain instances acidic catalysts for the condensation are desirable, e. g., acetaldehyde.

The reaction to produce the intermediate phenol-aldehyde condensation product is carried out for a period of time sufficient to produce a low molecular weight phenol-aldehyde product of the types above described, and the temperature is preferably not permitted to exceed about 275° F. The condensation time will vary, of course, with varying amounts of reactants and with variations in the molecular weight of the reactants, but, in general, depending upon the degree of agitation, the surface activity obtained in the reaction mass, the presence or absence of auxiliary catalysts, etc., a period of from 0.5 to about 5 hours will be found satisfactory for most cases.

THE PHENOL-ALDEHYDE-EPIHALOHYDRIN RESIN

After the phenol-aldehyde condensation product has been produced, it is then reacted with an epihalohydrin. Epihalohydrins are generally produced by dehydrohalogenating a halohydrin such as glyceryl dichlorohydrin. For the purposes of this invention it is preferred to use the dehydrohalogenation product of a polyhalogen-containing halohydrin. This yields a halogen-containing epoxide which, under the conditions herein employed, combines in such a manner with the phenolic OH group to produce an epoxide substituent. This group of materials has been the general formula:

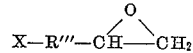

wherein X is selected from chlorine, bromine, and iodine (fluorine is not useful since it is not readily released for reaction) and R''' is an alkylene radical of 1 to 6 carbon atoms.

The amount of epihalohydrin, preferably epichlorohydrin, or epibromohydrin, is calculated to satisfy the free phenolic OH groups present in the phenol-aldehyde condensation product as shown in Formula VI above.

It is believed that the products resulting from the reaction performed as later disclosed have in the main the following general structure:

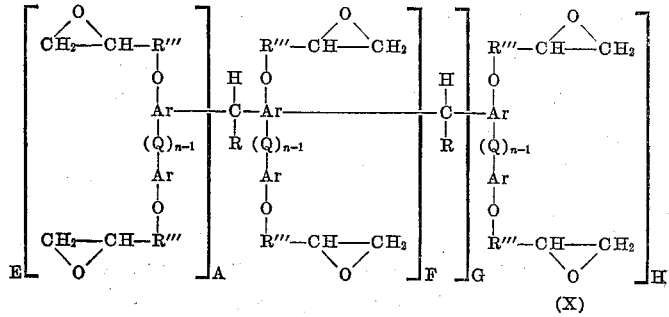

(X)

wherein the letter symbols have the significance above indicated. Since it is seldom that a chemical reaction goes 100% according to paper predictions, the product mass probably contains very minor amounts of unidentifiable by-products which do not, however, appear to interfere with the film-forming qualities of the resin.

This resin is insoluble in water and shows no tendency to emulsify under severe agitation in the absence of an emulsifying agent or water-soluble acid. Polyamines, such as ethylene diamine, cause this resin to set to a hard, insoluble mass in a relatively short time. When so cured, the resin is insensitive to acids, alkalies, soap solutions, iodine, hot water, cold water, etc. Films thereof are superior in toughness, flexibility, hardness and adhesion to almost any surface.

METHOD OF MAKING THE RESINS

While the mode of compounding the starting phenol-aldehyde condensation product is fairly well known, prior practice is not so generally applicable to the epihalohydrin reaction. The temperature at which the reaction between a phenol-aldehyde resin, of the type above described, and an epihalohydrin is critical. It has been found that above about 155° F. in the presence of alkali, the cyclic ether structure is destroyed yielding an aliphatic OH group and promoting aliphatic chain polymerization thereby inducing the possibility of gelation and increased water sensitivity or solubility. It is preferred to conduct the epihalohydrin reaction at temperatures less than 155° F. and most desirably at temperatures between 125° and 145° F. Lower temperatures down to room temperature may be used, but the reaction time becomes unduly long.

Even at these relatively low temperatures, there is some tendency to destruction of the cyclic ether structure if an excess of base, e. g., NaOH or KOH is present. It is, therefore, preferred to add the epihalohydrin directly to the phenol-aldehyde condensation product and then add slowly, or in small portions from time to time, the aqueous or alcoholic caustic solution. Much superior temperature control is thus obtained and local overheating is minimized. No reaction appears to occur in the absence of the base. The reaction is exothermic and may become uncontrollable if the caustic or other base is added all at once or too rapidly.

The amount of epihalohydrin employed is sufficient to provide at least an average of 2.25 cyclic ether groups per molecule of phenol-aldehyde condensation product. In general, the amount employed is about 1 mol of epihalohydrin per phenolic hydroxyl of the dihydric polynuclear phenol. What is preferred is to replace the hydrogen of each phenolic hydroxyl group with an epoxide-containing substituent. Moderate excesses of epihalohydrin over that required to accomplish this are not harmful, and the low temperatures and controlled addition of base do not cause substantial chain polymerization of this component.

The reaction may be conducted at normal atmospheric pressures. Super-atmospheric pressures are unnecessary and harmless.

Where the epihalohydrin is added immediately following an alkali condensation reaction between the dihydric polynuclear phenol and the aldehyde, it is best to add it over a period of time, 10–60 minutes, after cutting the condensation product with a solvent, such as a ketone. Thereafter, a fresh addition of basic solution, about 10% to about 50% strength, is added very slowly constantly watching the batch temperature to prevent it from exceeding about 155° F.

After the base had been added, the mass is agitated for an additional period of time to assure completion of the reaction insofar as is practicable. Usually under 5 hours is sufficient.

The product is then preferably neutralized with an acid such as phosphoric, and washed with water until substantially neutral to litmus. Retained water is removed from the resin azeotropically. Organic solvent, e. g., a ketone such as methyl ethyl ketone may be removed by distillation or added as desired.

It becomes convenient at this point to illustrate a preferred mode of compounding the resins of the present invention by giving illustrative examples thereof. It is to be understood that these examples are for the purpose of illustrating the mode of operation and are not to be construed as limiting the invention to the precise scope thereof since the principles involved in these examples may be readily translated to other specific examples.

Example I

Mol relationship:
 Bis-phenol _____ 1.00
 n-Butyraldehyde _____ .50
 Epichlorohydrin _____ 2.08

Into a flask are charged 820 parts bis-phenol A, 130 parts n-butyraldehyde and 5 parts stannous chloride. This mixture is agitated and heated until the temperature reaches 220° F. At this temperature, a solution of 50 parts sodium hydroxide in 50 parts water is added cautiously over a 10 minute period. After further agitating for an additional 15 minutes, 1,000 parts of methyl isobutyl ketone are added and the mixture allowed to cool to a temperature of 150° F. 694 parts epichlorohydrin are then added to the mixture over a period of 20 minutes. Ten minutes later a solution of 242 parts sodium hydroxide in 1,000 parts water is cautiously added over a period of 1 hour using external cooling to keep the temperature from exceeding 155° F. After all the alkali solution is in, the mixture is held at 150° F. for 3 hours. Then 300 parts of methyl isobutyl ketone are added and the mixture neutralized with phosphoric acid to a pH of 6–7. A separation of layers is made and this is followed by a series of three washes with water to remove salt. Water is removed from the resin solution azeotropically. The resin solution is then filtered and the solvent distilled off. The final product is a semi-solid with an amber color.

Example II

Mol relationship:
 Bis-phenol _____ 1.00
 n-Butyraldehyde _____ .67
 Epichlorohydrin _____ 2.10

Into a flask are charged 1960 parts bis-phenol A, 414 parts n-butyraldehyde and 12 parts stannous chloride. This mixture is agitated and heated until the temperature reaches 220° F. At this temperature a solution of 120 parts sodium hydroxide in 120 parts water is cautiously added over a 10 minute period. Agitation at this temperature is continued for an additional 30 minutes. The mixture is cooled and 2400 parts of methyl isobutyl ketone are added. This is followed by the addition of 1660 parts epichlorohydrin added over a 15 minute period. When the mixture has cooled to 130° F., a solution of 582 parts sodium hydroxide in 2400 parts water is cautiously added over a 2¼ hour period, being careful not to let the temperature exceed 155° F. Agitation at this temperature is continued for an additional 7 hours. This is followed by neutralizing with phosphoric acid to a pH of 5–6. Several washes with water are made to remove most of the salt and then the water is removed azeotropically. The resin solution is filtered followed by removing the solvent by distillation. The final product is a semi-solid with an amber color.

Example III

Mol relationship:
 Bis-phenol _____ 1.00
 2-ethylhexaldehyde _____ .50
 Epichlorohydrin _____ 2.08

This resin is made similar to that of Example I except that 2-ethylhexaldehyde is substituted for the n-butyraldehyde. No trouble is encountered with emulsions when washing the resin solution. The final product is a semi-solid with an amber color.

Example IV

Mol relationship:
Bis-phenol A _____ 1.0
Octadecenyl aldehyde _____ 0.57
Epichlorohydrin _____ 2.0

Into a 3 liter, 3-necked flask were placed 30 parts of sodium hydroxide, 30 parts of water, 492 parts of bisphenol A, 3 parts of stannous chloride, and 284 parts of octadecenyl aldehyde. The flask was equipped with a thermometer, agitator and distillation receiver. The temperature was slowly raised while the mixture was under agitation. At about 260° F. the mixture may show foaming. This can be overcome by adding a trace of an antifoaming agent such as a polymethyl silicone.

After about 2 hours, the temperature has risen to about 400 to 410° F. and water is carried over by unreacted aldehyde. The water is removed and the aldehyde returned to the mixture. After 3 hours and at a temperature of about 425° F., 104 parts of octadecenyl aldehyde were slowly added to the mixture over a period of 40 minutes. The temperature of the mixture was gradually increased to 500° F. for an additional 3.75 hours. The water and unreacted aldehyde were removed by distillation. The final product was cooled and subsequently reacted with epichlorohydrin in the ratio of 2 mols of epichlorohydrin to 1 mol of bisphenol at 140° F. The resulting resinous material is quite viscous at 100% NVM and may be cut with the normal solvent.

Example V

Mol relationship:
Bisphenol A _____ 1.0
Propionaldehyde _____ 0.53
Epichlorohydrin _____ 2.08

Into a 5-liter, 3-neck flask equipped with mechanical stirrer, thermometer, reflux condenser and dropping funnel were placed 820 g. (3.6 mols) bisphenol, 110 g. (1.9 mols) propionaldehyde and 5 g. of stannous chloride. The mixture was heated to around 175° F. at which point it had a mushy consistency. A solution of 50 g. (1.25 mols) of sodium hydroxide in 50 g. of water was added dropwise over a half-hour period maintaining the temperature below 200° F. After addition the mixture had a syrupy consistency and the temperature was held for 50 minutes below 200° F. and then for 45 minutes at 225–230° F. Heat was then turned off.

At this point 1,000 g. of methyl isobutyl ketone were added slowly and the temperature allowed to coast down to 140° F.

Then 694 g. (7.5 mols) epichlorohydrin were added during a 25 minute period. This was followed by a 3½ hour addition of 242 g. (6.05 mols) of sodium hydroxide in 1,000 g. of water, always keeping the temperature below 140° F. After complete addition the mixture was held at 140–145° F. for 5.5 hours before stopping the reaction for the night. Then the mixture was neutralized with 75% $H_3PO_4$ to a pH of 6–7. Separation of layers showed good partition. The organic layer was washed with 1,000 g. of water containing 5 g. of $H_3PO_4$ and again with water.

Retained water was then removed by azeotropic distillation and the anhydrous organic layer filtered to remove retained salt. Solvent was removed by distillation followed by an air blow.

The resulting resin was a semi-solid material with a Gardner-Holdt color of 9 and a viscosity at 70% NVM in (3038) of S.

It cured with polyamines similar to the bisphenol-butyraldehyde-epichlorohydrin resin of Example I.

Example VI

Mol relationship:
Bisphenol A _____ 1.0
37% aqueous formaldehyde _____ 0.5
Epichlorohydrin _____ 2.08

This resin is made similar to that of Example II except that formaldehyde has been substituted for n-butyraldehyde. Difficulty is encountered in washing this resin and a solution of the resin in a mixture of methyl isobutyl ketone and n-butanol is more easily isolated. If the solvent is removed from the resin it is a light colored, hard, brittle resin. This resin cures in a comparable manner as that of Example I when treated with polyamines.

All of the foregoing polyepoxides bake out cured and flexible using from 5–15% polyamine as a cross-linking agent. These resins will also air-dry and force dry, using as little as 3% polyamine. The polyamines which may be used to cure these resins include those normally employed for curing polyepoxide ether type resin, namely, for example, ethylene diamine, diethyl triamine, propylene diamine, and the like. Monoamines such as triethylamine and dimethyl benzylamine also yield cured resinous films.

These resins are quite versatile particularly when treated with varying amounts of polyamines. Reaction occurs between the polyamines and the resin to cause gellation at room temperature in a matter of a very few hours, or the mixture can be sprayed and baked. Thus these resins are either air-dry or baking materials. Their flexibility, toughness, adhesion and gloss are indeed outstanding. These resins may be used as clear finishes for wood or metal objects, or in the pigmented form, on sheet rock or wallboard as substitute tiles. They can also be used to cover various objects of masonry such as bricks, concrete, or cinder blocks, etc. They are also useful as adhesives and potting and moulding compounds. By themselves, the resins of this invention are stable under varying conditions of heat and humidity. However, after mixing these resins with the amine curing agents, their "pot life" is rather short.

In addition to utility as vehicles in coating compositions, these resins may be further reacted with a drying oil fatty acid or semi-drying oil fatty acid or a mixture of such acids to yield oil modified resins. Such vegetable and marine oil acids include linseed oil fatty acids, dehydrated castor oil fatty acids, tung oil fatty acids, cottonseed oil fatty acids, safflower oil fatty acids, fish oil fatty acids, and their interpolymers with vinyl substituted aromatic hydrocarbons, e. g., styrene, vinyl toluene, etc. (10% to 60% vinyl aromatic hydrocarbon and 90% to 40% fatty acid) may be used to esterify the resins of this invention to yield useful vehicles for coating compositions of the baking or air drying type without curing catalyst.

This reaction proceeds smoothly through the effect of the carboxyl group opening up the epoxide group and forming an ester therewith. A particularly useful class of such esters are those made from the resins of this invention and interpolymers of vinyl monomers, such as styrene, vinyl toluene, etc. with unsaturated fatty acids and particularly drying oil fatty acid interpolymers. Specific examples of such interpolymers include:

Styrenated linseed oil fatty acids
Styrenated soyabean oil fatty acids
Styrenated dehydrated castor oil fatty acids
Styrenated cottonseed oil fatty acids
Styrenated safflower seed fatty acids
Styrenated tung oil fatty acids
Styrenated oiticica oil fatty acids The free fatty acids above mentioned without styrene and those interpolymers with vinyl toluene replacing part or all of the styrene may be used to form the esters. The reaction is preferably carried out in the presence of a solvent to facilitate handling and may be conducted at room temperature or temperatures up to 250° F. or higher if desired. This product cures on exposure to air although it is especially adapted to baking at 300° F. to 375° F. The esters may be pigmented according to usual paint formulation techniques or used as a clear varnish.

Specific illustrative examples of the preparation of such esters are as follows:

*Example VII*

510 grams of the resin prepared in accordance with Example I above were esterified with 680 grams of a styrenated linseed oil fatty acid in the conventional way. The styrenated acid was prepared using equal parts by weight of linseed oil fatty acids and styrene and interpolymerizing at about 400° F. in the persence of $SO_2$ and benzidine as catalysts (redox). This styrenated acid had an acid value of 116 and a viscosity of X, Gardner-Holdt. The esterification reaction was carried out by adding the styrenated acid to the resin in about ⅓ portions at 350° F., 350° F., and 400 F., respectively. The mass was blown with $CO_2$ and the temperature raised to 420° F. in 10 minutes where it was held for 1 hour. The temperature was then raised to 470° F. where it was held for an additional 15 minutes. The resultant ester was cut in xylene to 70% non-volatile matter (NVM). Using 0.1% cobalt naphthenate drier, the films set in 1 hour, 27 minutes, were Kraft Free in 1 hour, 47 minutes and Foil Free in 3 hours, 2 minutes.

*Example VIII*

550 grams of the resin of Example I were esterified with 650 grams of soyabean oil fatty acids at 460° F. in the presence of 15 gs. of triphenyl phosphite following conventional procedure. The resin was cut to 70% NVM in mineral spirits and then showed a viscosity of V, a color of 6 and an acid number of 1.5.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. A hydrophobic resinous material formed from (a) a dihydric polynuclear phenol containing at least one aldehyde reactive position and having the formula:

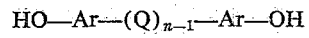

wherein Ar is an aromatic nucleus containing one aldehyde reactive position, Q is selected from the group consisting of oxygen, sulphur, carbonyl, alkylene, and alkylidene radicals of 1 to 6 carbon atoms, and $n$ is from 1 to 2, (b) an aldehyde, and (c) an epihalohydrin, by condensing said phenol with from 0.25 to 0.65 mol of said aldehyde for each mol of said phenol, and subsequently reacting at a temperature below about 155° F. the resultant phenol-aldehyde condensation product with an epihalohydrin in the presence of a base in an amount sufficient to provide about 1 mol of epihalohydrin for each of the phenolic hydroxyls in said condensation product.

2. A hydrophobic resinous material capable of hardening in the presence of a polyamine formed from (a) a dihydric polynuclear phenol containing at least two aldehyde reactive positions and having the formula:

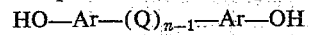

wherein Ar is an aromatic nucleus containing one aldehyde reactive position, Q is selected from the group consisting of oxygen, sulphur, carbonyl, alkylene, and alkylidene radicals of 1 to 6 carbon atoms, and $n$ is from 1 to 2, (b) an aliphatic aldehyde containing from 1 to 20 carbon atoms, and (c) an epihalohydrin, by condensing said phenol with said aldehyde in the presence of a base to a low molecular weight stage such that the average molecular hydroxyl content is from about 2.25 to 8, the ratio of said phenol to said aldehyde being from 1:0.25 to 1:0.65, and subsequently reacting at a temperature below about 155° F. the resultant phenol-aldehyde condensation product with an epihalohydrin in the presence of a base in an amount sufficient to provide about 1 mol of epihalohydrin for each of the phenolic hydroxyls in said condensation product.

3. A resinous material in accordance with claim 1 in which the dihydric polynuclear phenol is a 4,4'-dihydroxy diaryl alkane.

4. A resinous material in accordance with claim 1 in which the dihydric polynuclear phenol is 4,4'-dihydroxy diphenyl dimethyl methane.

5. A resinous material in accordance with claim 1 in which the aliphatic aldehyde contains from 4 to 7 carbon atoms.

6. A resinous material in accordance with claim 1 in which the aliphatic aldehyde is n-butyraldehyde.

7. A resinous material in accordance with claim 1 in which the epihalohydrin has the general formula:

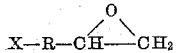

wherein R is an alkylene radical of from 1 to 4 carbon atoms and X is selected from the group consisting of chlorine, bromine and iodine.

8. A resinous material in accordance with claim 1 in which the epihalohydrin is epichlorohydrin.

9. A resinous material in accordance with claim 1 in which the dihydric polynuclear phenol is 4,4'-dihydroxy diphenyl dimethyl methane, the aliphatic aldehyde is n-butyraldehyde, and the epihalohydrin is epichlorohydrin.

10. The resinous material of claim 1 further reacted with an unsaturated fatty acid selected from the group consisting of drying oil fatty acids and semi-drying oil fatty acids.

11. The resinous material of claim 1 further reacted with the interpolymer of an unsaturated fatty acid selected from the group consisting of drying oil fatty acids and semi-drying oil fatty acids and a monovinyl aromatic hydrocarbon monomer.

12. The method of making a phenol-aldehyde-epoxide resin containing an average of more than 2.25 epoxide groups per molecule which comprises the steps of condensing one mol proportion of a dihydric polynuclear phenol with from 0.25 to 0.65 mol of an aldehyde in the presence of a condensation catalyst to a low molecular weight stage such that each molecule contains, on the average, more than 2.25 phenolic hydroxyls but less than 8, on the average, of such phenolic hydroxyls, establishing a temperature of no more than about 155° F. and then adding an amount of epihalohydrin sufficient to provide about 1 mol of epihalohydrin for each of the free phenolic hydroxyls in said condensation product, adding a solution of alkali slowly to said reaction mass such that the temperature is maintained at or below 155° F. removing the salt formed and recovering the resinous product.

13. A method in accordance with claim 12 in which the polyhydric polynuclear phenol is 4,4-dihydroxy diphenyl dimethyl methane, the aldehyde is n-butyraldehyde and the epihalohydrin is epichlorohydrin.

References Cited in the file of this patent

UNITED STATES PATENTS

| | | |
|---|---|---|
| 2,564,191 | DeGroote et al. | Aug. 14, 1951 |
| 2,596,737 | Tess et al. | May 13, 1952 |
| 2,658,885 | D'Alelio | Nov. 10, 1953 |
| 2,695,894 | D'Alelio | Nov. 30, 1954 |

FOREIGN PATENTS

| | | |
|---|---|---|
| 503,546 | Belgium | June 15, 1951 |